Figure 1:
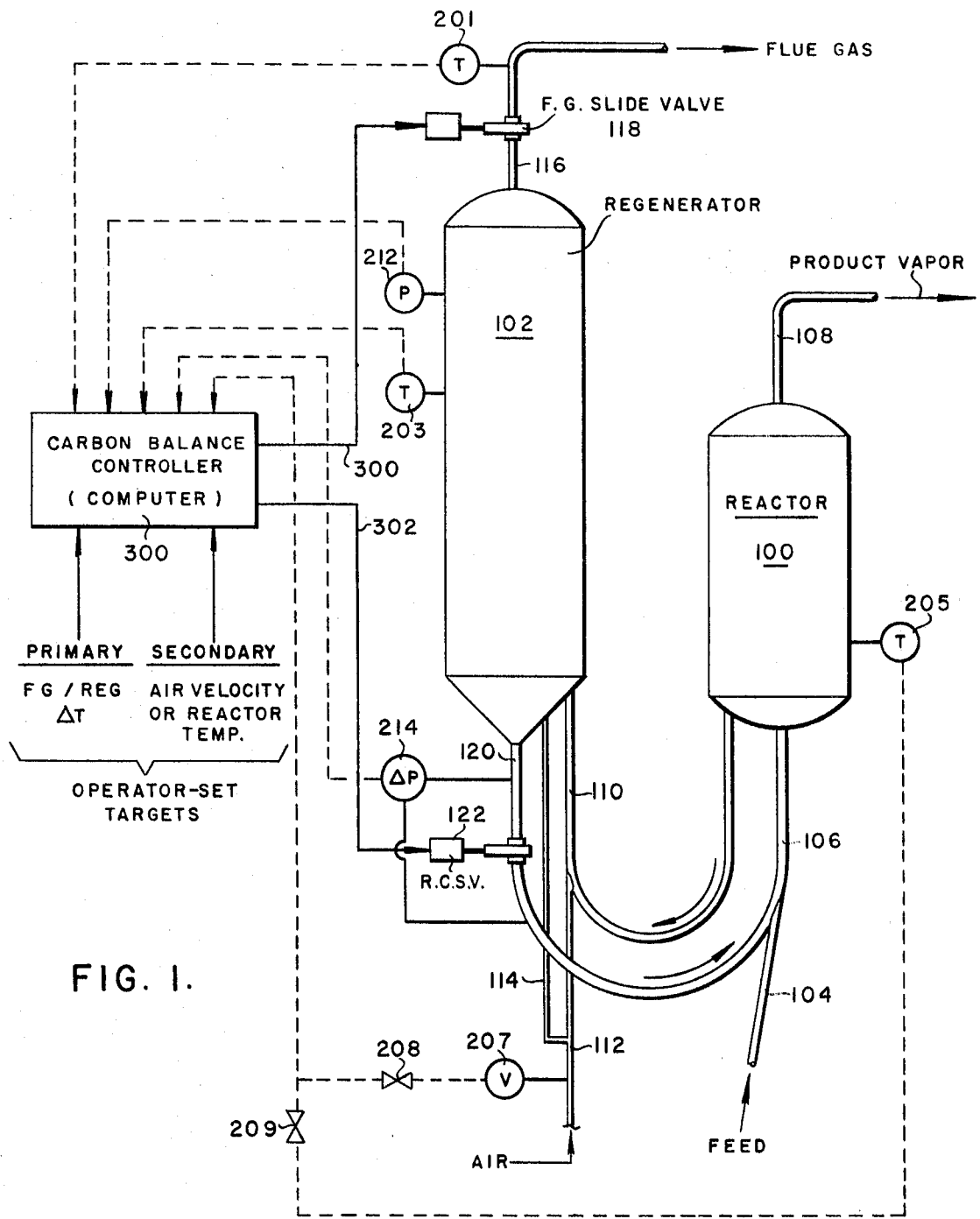

United States Patent

[11] 3,591,783

[72] Inventor Robert E. Zumwalt
     Baytown, Tex.
[21] Appl. No. 801,388
[22] Filed Feb. 24, 1969
[45] Patented July 6, 1971
[73] Assignee Esso Research and Engineering Company

[54] AUTOMATIC CONTROL OF FLUID CATALYTIC CRACKING UNITS
7 Claims, 2 Drawing Figs.

[52] U.S. Cl.................................................235/151.12,
                                                          208/164
[51] Int. Cl...................................................G05b 15/02,
                                                          C10g 13/14
[50] Field of Search.......................................... 208/164;
                                                          235/151.12

[56] References Cited
UNITED STATES PATENTS

| | | | |
|---|---|---|---|
| 3,175,968 | 3/1965 | Berger.......................... | 208/164 |
| 3,261,777 | 7/1966 | Iscol et al..................... | 208/113 |
| 3,378,483 | 4/1968 | Worrell et al................. | 208/164 |
| 3,410,793 | 11/1968 | Stranahan et al............. | 208/164 |

Primary Examiner—Eugene G. Botz
Attorneys—Thomas B. McCulloch, Melvin F. Fincke, John S. Schneider, Sylvester W. Brock, Jr., Kurt S. Myers and Timothy L. Burgess ABSTRACT: A fluidized catalytic cracking unit is controlled for carbon balance and maximization of a secondary control function by using a general purpose digital computer, which is responsive to various temperatures and pressures, as the controlling means for variables such as the settings on the regenerator flue gas control valve and the regenerated catalyst circulation control valve. The process of the present invention involves obtaining a plurality of signals representing control variables, comparing these with the desired values for the control variables, and carrying out in a general purpose computer the calculation of a carbon adjustment factor according to the algorithm:

$$\Delta SV_n = K_r \left[ \text{Abs.}\ (\delta T_n) + K_s \right](\delta T_n) + K_p \left[ \frac{\Delta T_n - \Delta T_{n-1}}{\Delta t} \right]$$

where each of the variables has the definition set forth in the specification.

When $\Delta SV_n$ is positive, indicating a correction for carbon-burning conditions, the desired control action is obtained by a logic sequence which determines whether either of the controlled variables is under constraint and if not, takes the control step most consistent with optimization of the secondary variable. If one or both of the controlled variables are under constraint, the logic sequence indicates the correct control step to be taken or, if no control step can be taken, indicates that none can be taken.

When $\Delta SV_n$ is negative, indicating a correction for carbon-building conditions, the logic sequence likewise allows the choice of the optimum control step to be taken or, if none can be taken, indicates this fact.

After the logic sequence based upon the algorithm has been completed, a signal is obtained to move the correct control valve (that is, make the required adjustment in the controlled variable), the signal being corrected to reflect the difference in control function (depending upon which valve is to be moved) and for the position of the valve immediately prior to movement to the new position.

By carrying out the control function of the present invention, carbon balance can be well controlled in a catalytic cracking unit while the secondary control variable (such as regenerator air velocity) can be controlled or maximized.

AUTOMATIC CONTROL OF FLUID CATALYTIC CRACKING UNITS

The present invention is directed to a control procedure whereby a secondary control objective (such as regenerator air velocity) can be controlled or maximized at the same time that the carbon balance of a fluidized catalytic cracking unit is being kept under control. Basically, the present invention is devoted to the use of a general purpose digital computer (such as the IBM 1800) to carry out the periodic sampling of a plurality of variables (such as temperatures, pressures, and flow rates), compare certain of these values with predetermined limits, use other of the sensed values in solving the algorithm for carbon balance control, perform a logic sequence to select the proper control step to be taken (e.g., choosing between the flue gas slide valve and the regenerated catalyst slide valve), generate a corrected signal proportional to the amount of desired change in the controlled variable, and transmit such signal to the controlled valve to accomplish the desired correction. The entire sequence is repeated at short intervals of time (e.g., 1—3 minutes apart).

The invention can best be understood by the following description, wherein the catalytic cracking unit will be described, as well as the equipment used in the cracking unit for generating control signals proportional to the operating variables and the equipment used, responsive to signals from the computer, to accomplish the directed changes in the operating procedure.

Referring now to FIG. 1, a catalytic cracking unit is schematically shown as comprising a reactor 100 and a regenerator 102. It is to be understood that the reactor may be a dense phase fluidized bed reactor or a disperse phase transfer-line reactor; either is suitable insofar as the present control function is concerned. The feed to the reactor is introduced by way of a line 104 and admixed with hot, regenerated catalyst which is conducted by way of line 106 from the regenerator 102.

Within the reactor 100, the feedstock is catalytically cracked, yielding a product vapor of lower average molecular weight than the feed. This product vapor is removed by way of vapor line 108 for fractionation and further treatment. A byproduct of this cracking reaction is coke, which contains hydrogen and carbon. This coke is deposited on the catalyst particles and tends to deactivate the catalyst. The coke is burned from the catalyst particles by contact with air in the regenerator section of the cracking unit. It is the balancing of coke laydown and burnoff rates which provides the present invention with its great utility.

The catalyst from the reactor, after separation from the product vapor, is removed by way of line 110 and is conducted to the regenerator 102. The catalyst may be directed to the regenerator by gravity alone if the reactor is located higher than the regenerator or it may be lifted into the regenerator by at least a portion of the regenerator air supply which is introduced by way of line 112. The remainder of the regenerator air is schematically shown in FIG. 1 as being introduced by way of a line 114.

Within the regenerator 102, the coke which has been laid down on the catalyst particles during the reactions in reactor 100 is contacted with oxygen in the air and burned to produce water vapor, carbon dioxide and carbon monoxide. The water vapor and gases are removed by way of line 116 through the flue gas slide valve (FGSV) 118.

Since the coke produced in the reactor is approximately 90 weight percent carbon, it is commonly referred to as "carbon" and it will be so called hereinafter.

Regenerated catalyst is discharged from the regenerator by way of line 120, and is passed through the regenerated catalyst slide valve (RCSV) 122 and thence through line 106 for introduction into the reactor as hereinabove described.

It is imperative that carbon balance be maintained in operating a catalytic cracking unit; that is, the amount (rate) of carbon burned in the regenerator must equal the amount of carbon produced in the reactor. If more carbon is produced than is burned, carbon will build up on the catalyst to such an extent that the reaction is severely hindered, the result being a diminution in conversion and an increase in the percentage of undesirable products being produced. On the other hand, if more carbon is burned than is produced, carbon will be burned off the catalyst and the resulting excess (unconsumed) oxygen in the flue gas will react with carbon monoxide in the phenomenon called "after-burning." The afterburning reaction generates heat and, if it becomes too severe, will create temperatures high enough to damage the regenerator.

The control of carbon balance depends upon the correlation of several process temperatures, from which inferences may be drawn concerning carbon building or carbon burning situations. A number of suitable temperature differentials may be used as indicators of carbon balance, such as (1) the difference between flue gas and regenerator bed temperatures, (2) the difference between the temperature of the catalyst entrant into the regenerator and the regenerator bed temperature, or (3) the difference between the temperatures at the top and the bottom of the catalyst riser line (in those units which lift the catalyst into the regenerator via air entrainment). The particular temperature differential to be used will depend upon the type of unit employed. Generally, the difference between flue gas and regenerator bed temperatures will be suitable. In the following description it will be assumed that the flue gas-regenerator bed temperature differential is to be employed as the parameter indicating carbon balance conditions.

The difference between flue gas and regenerator bed temperatures is called the "stack $\Delta T$." In normal operations, the flue gas temperature will be from 10° to 50° F. higher than the temperature of the dense bed, due to the afterburning reaction between a slight amount of excess oxygen and carbon monoxide in the flue gas. When the stack $\Delta T$ increases, it is indicative of an increase in the amount of excess oxygen which is available for reaction with the carbon monoxide in the flue gas. Under these conditions, the air rate is too high for the then-existing carbon production rate (or, stated in another way, the carbon production rate is too low for the then-existing air rate), and the unit is said to be operating under "carbon-burning" conditions (i.e., the net percentage of carbon left on the regenerated catalyst is being reduced).

Similarly, when the stack $\Delta T$ decreases it is indicative of a deficiency of air at the then-existing carbon production rate and the unit is said to be operating under "carbon-building" conditions (i.e., the net percentage of carbon left on the regenerated catalyst is being increased).

The carbon balance of the unit is a function of catalyst circulation rate, air rate, feed rate, catalyst holdup in the reactor and feed quality. Generally, however, the carbon balance control function is carried out quite simply by adjusting either the flue gas slide valve (FGSV), which affects air rate and catalyst circulation rate, or the regenerated catalyst slide valve (RCSV), which affects only the catalyst circulation rate, or both. As used hereinafter, when it is stated that a valve is to be "opened" or "closed," it is to be understood to mean an incremental change in slide valve position in the direction of fully open or fully closed, respectively. During normal operation of the unit, neither the FGSV or the RCSV may be fully closed, and only rarely are they (or either of them) fully open.

There are some unit restraints which make it undesirable to make adjustments in one or both of the slide valves under certain conditions. For example, the $\Delta P$ across the RCSV must be maintained at or above a given minimum value in order to avoid the danger of reverse circulation which might bring hydrocarbon feedstock into the regenerator where it would contact the regeneration air. Further, the regenerator pressure must operate between certain maximum and minimum limits. Under most conditions, either the RCSV or the FGSV may be used. However, when the RCSV $\Delta P$ is at or below the minimum allowed value, the RCSV cannot be further opened in response to a control signal, or the risk of feed intrusion is increased. It can, however, be partly closed in response to a control signal, since the ΔP would thereby be increased. Further, the regenerator pressure cannot be reduced when the RCSV ΔP is at or below its desired minimum, since this would itself have the effect of lowering the ΔP across the RCSV. Therefore, under those conditions the FGSV cannot cannot be further opened, but can be moved toward the fully closed position in response to a signal. Likewise, when the regenerator pressure is at or below its desired minimum, the FGSV cannot be further opened, since this would have the effect of reducing regenerator pressure; and, when the regenerator pressure is at or above the desired maximum, the FGSV cannot be further closed, since this would have the effect of increasing regenerator pressure.

All of these factors are taken into consideration in the present invention.

The control elements which are used in the present invention are basically well known. The temperatures which must be determined are sensed by thermocouples and a signal directly related to the temperature is generated and sensed by the computer as a part of the periodic sampling of variables. The pressure sensors likewise generate a signal directly related to the pressure, which is available to the computer when it samples. The pressure drop ΔP across the RCSV is sensed by a what is commonly referred to as "DP cell" (standing for "differential pressure cell") and a signal directly related to that pressure drop is generated and made available to the computer upon demand. The rate of flow of air supplied to the regenerator is obtained either by an orifice meter located in a combined air line or by individual orifice meters in each of the air source lines. In the latter case the total air rate is obtained by summation of the individual rates. Likewise, a signal directly related to the rate of flow is made available to the computer upon demand. The thermocouples which are used typically made from iron and constantan thermocouple wires and may be constructed by the user or purchased from a manufacturer. The DP cell suitably may be a Foxboro Model 13A-1. The pressure sensor and recorder may be a Foxboro 611 GM-AS2. The orifice meter may be a Foxboro M/613DM.

FIG. 1 represents a suitable system, but it is to be understood that other sensors may be used instead of those shown therein. Referring again to FIG. 1, the control system is seen to comprise a temperature sensing element 201 which is located in the flue gas line near the regenerator. Although it is shown for clarity as being located downstream of the FGSV, it can as well be located between the regenerator and the FGSV and preferably would be so located. A similar sensing means 203 is supplied for sensing the bed temperature within the regenerator. It is located below the upper level of the fluidized bed of catalyst within the regenerator, so as to sense the dense phase bed temperature rather than the temperature in the disperse phase. A temperature sensing means 205 may be likewise provided in the reactor 100, if the reactor temperature is to be used as a secondary control variable. Usually, however, the secondary control variable will be the regenerator air velocity, calculated from the amount of air supplied to the regenerator, e.g., as sensed by the orifice meter 207, which in practice may be a plurality of orifice meters located in each of a plurality of ducts feeding air into the regenerator and the computer adds the resultant signals to obtain total in flow.

In the scheme shown in FIG. 1, the regenerator air velocity is used as the secondary control objective as indicated by open valve 208 and closed valve 209. However, where the reactor temperature is to be used as a secondary control objective, it will be substituted for the signal from the orifice meter. Although valves are shown as controlling the signals from the secondary control sensing points, implying the use of pneumatic signals, it is to be understood that electronic signals may and preferably will be used in supplying information to the computer 300. The regenerator pressure is sensed by means of pressure gauge 212, and the ΔP across the RCSV is sensed by the DP cell 214. Thus, it is seen that signals representing each of the material variables are supplied and made available to the computer.

The computer is programmed to sample each of the material variables on a repetitive basis. The period of time between cycles of sampling will hereinafter be referred to as the "sample period." Upon reading each of the material variables for a given sample period, the computer is then able to carry out the control function and, if required, produce signals for repositioning the FGSV and/or the RCSV. These signals would be transmitted by way of lines 300 and 302. Control signals could, preferably, be provided as a number of pulses which would be sensed by an indexing motor which adjusts the valve position controller, which in turn controls the motor which drives the slide valves. A Foxboro 67 HTGM motor valve is suitable for such use. Other systems, such as a DDC-type output station, can be used In some such cases the indexing motor would not be required.

ALGORITHM.

The control upon which the primary carbon balance control is based is stated as:

$$\Delta SV_n = K_r [\text{Abs}\ (\delta T_n) + K_s] \delta T_n + K_p \frac{\Delta T_n - \Delta T_{n-1}}{\Delta t}$$

where $\Delta SV_n$ is the change in slide valve position for the $n$th sampling period expressed in percent based upon slide valve travel, from fully closed to fully open being 100 percent;

$K_r$ is the reset control constant;

$K_s$ is a control constant greater than zero;

$\delta T_n$ is the deviation at the $n$th sampling period, defined as the stack ΔT at the $n$th sampling period minus the desired value of stack ΔT;

Abs($\delta T_n$) is the absolute value of $\delta T_n$;

$K_p$ is the proportional control constant;

$\Delta T_n$ is the temperature difference represented by said first signal at the $n$th sampling period;

$\Delta T_{n1}$ is the temperature difference represented by said first signal at the $n$th−1 sampling period; and $\Delta t$ is the period of time between samplings.

The first part of the algorithm:

$$K_r [\text{Abs}(\delta T_n) + K_s]$$

is proportional to the reset gain constant in standard parlance, although the inclusion of the deviation $\delta T_n$ as a part of the expression makes the value variable with the deviation. The use of a positive value for $K_s$ makes the total value of the reset constant a significant amount when the deviation approaches zero, so that a control function can be obtained. The use of the absolute value of the deviation as a part of this expression allows the sign or deviation, $\delta T_n$, by which the expression $K_r[\text{Abs}(\delta T_n)+K_s]$ is multiplied, to control the sign (+ or −) of the total value of the reset portion of the algorithm.

The deviation in the expression is the difference between the actual stack ΔT and the desired stack ΔT. It is obvious that the larger the deviation from the desired target, the greater the control function should be. This is accomplished in the algorithm by including the deviation $\delta T_n$ twice, in essence making the square of the deviation a part of the control adjustment $\Delta SV_n$. Of equal importance is the rate and direction in which the deviation is changing. If the deviation is increasing in a positive direction, the control action should recognize the fact that it is moving in the positive direction. If, however, the deviation is decreasing, then the control function should recognize the fact that a smaller control correction is required. The second portion of the algorithm $$K_p \frac{\Delta T_n - \Delta T_{n-1}}{\Delta t}$$

allows the control function to have "foresight" based upon the direction of change. This slope is obtained in the computer by retaining the ΔT from the previous sampling period and using that for comparison with the ΔT in the $n$th sampling period, and dividing it by the time between sample periods:

$$\frac{\Delta T_n - \Delta T_{n-1}}{\Delta t}$$

Thus, it is seen that in the algorithm, the first term is equivalent to the error squared reset mode of control, wherein deviations near the target cause only slight correction, but as the deviation becomes larger, significant correction is made. The second, or slope, term is equivalent to the proportional action of a conventional controller. Utilizing the algorithm, good control can be made on the basic task of maintaining carbon balance. A sample period (i.e., the interval of time between initiation of two successive samplings) of 2 minutes has been found to be about the best sample period for which good control response can be obtained on the particular unit on which the control system was tested, and generally sample periods of 1—3 minutes will be suitable for most units. In no event should the sample period exceed 30 minutes. For best results, the tuning constants $K_r$, $K_s$ and $K_t$ must be chosen so that the slope term predominates. A high rate of change in the stack $\Delta T$ requires that corrective action be taken, regardless of whether stack $\Delta T$ is above or below its target.

The change in slide value position in response to a repositioning command must be limited in order to avoid upset of the unit. The limit $\Delta SV_{max}$ must be chosen carefully, because of the predominance of the slope term in the algorithm. When the stack $\Delta T$ is changing rapidly, the slope term may indicate a "desired" change of several percent for the slide valve. Such a large change is not desirable, since it may lead to upset conditions in the unit. In effect, by setting a maximum limit on $\Delta SV$, a limit is set on the gain of the control loop under conditions of large carbon imbalance. This leads to much smoother and better control. For most installations, $\Delta SV_{max}$ should be about 1 percent to 2 percent of slide valve travel, depending on whether the RCSV or the FGSV is used for control. The FGSV can tolerate a higher $\Delta SV_{max}$ than the RCSV.

Solution of the algorithm gives both the direction of control and the amount of control that needs to be applied. The sign of $\Delta SV_n$ indicates whether correction for carbon building or carbon burning should be made; a positive value indicates correction for carbon burning and a negative value indicated correction for carbon building. Assuming that a correction for carbon burning is to be accomplished, the RCSV may be opened the required amount or the FGSV may be closed the required amount. Where neither slide valve is under restraint, the proper control valve will be chosen in view of the secondary control variable. For example, if the air velocity is at or above target, and the regenerator pressure is not at or above the desired maximum, the FGSV will be closed rather than opening the RCSV. However, if the air velocity is below target, the RCSV will be opened, thereby reducing regenerator pressure and allowing a greater flow of air into the regenerator. This selection is done by the computer based upon a logic sequence introduced by the program.

When air blower capacity is not limiting the production rate of the cracking unit, the velocity is usually controlled very closely to its target, thereby stabilizing the operation of the unit. When blower capacity is limiting, the use of a target velocity high enough to be unachievable will cause the computer program to open the FGSV until the RCSV minimum $\Delta P$ constraint is reached. The air rate to the unit is thereby maximized, and is consistent with the carbon balance. By maximizing air rate, unit capacity is maximized.

THE COMPUTER.

A general purpose computer, such as the IBM 1800 and the GE 4020, may be used for the entire control sequence, beginning with the sampling of the data points and ending with the generation of control signals for the operation of the slide valves. The computer may be programmed by using any suitable machine language or programming language, such as GPCP [discussed in "Generalized Process Control Programming System" by Ewing et al. published in Vol. 63 No. 1 of *Chemical Engineering Progress* Jan. 1967), pages 104—110], PROSPRO IBM Application Program H20-0261-0), Standard Fortran language or basic machine language.

Figure 2:
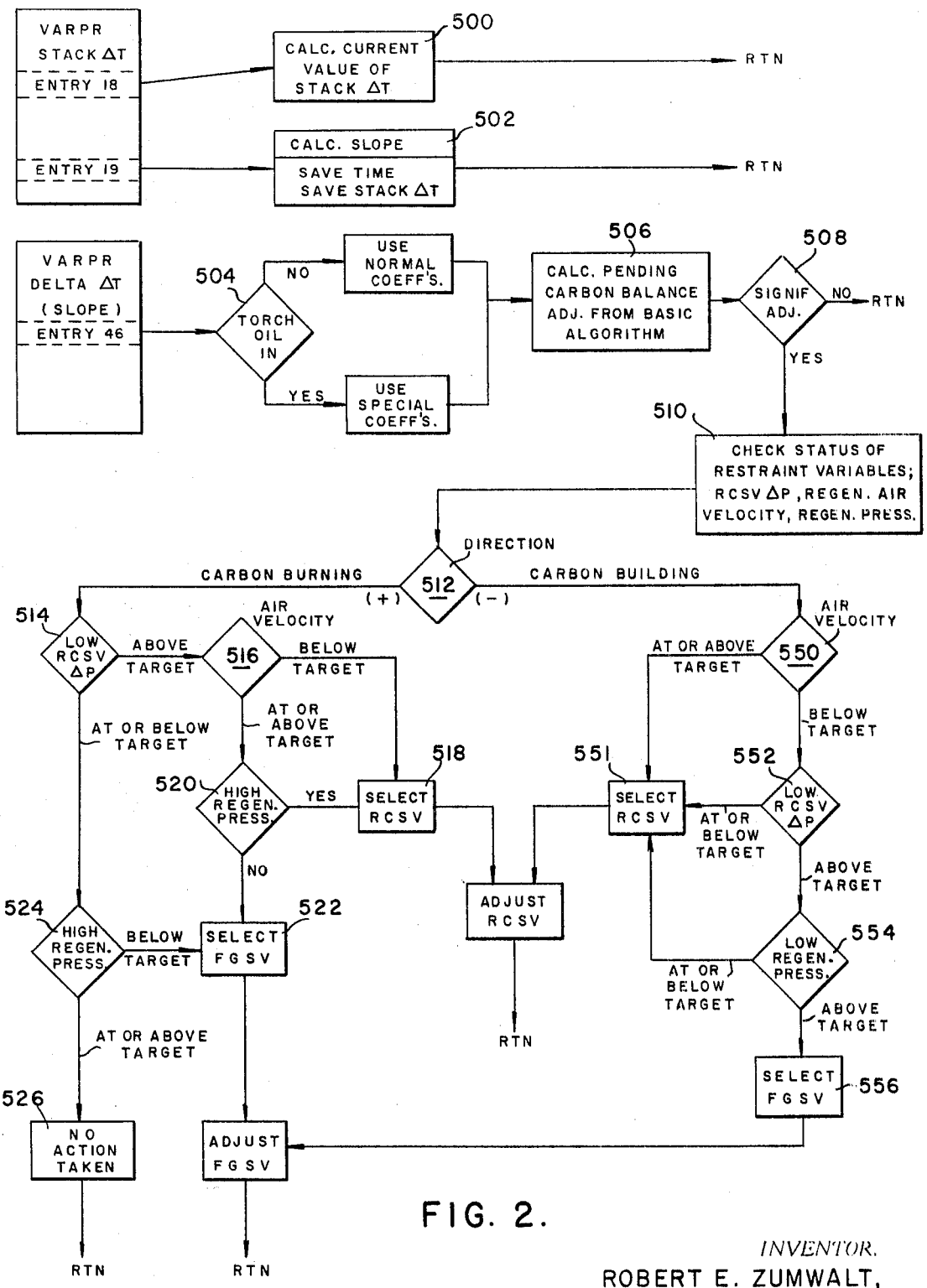

The operation of the computer in response to the program is shown in FIG. 2, which is a block diagram of the carbon balance control sequence. Referring now to FIG. 2, it is seen that the first action of the computer is shown in block 500 as calculating the current valve of stack $\Delta T$, which is accomplished by sampling the flue gas temperature (e.g., from sensor 201 in FIG. 1) and the regenerator bed temperature (e.g., from sensor 203 in FIG. 1). The calculated stack $\Delta T$ is then retained. The second action shown in block 502 is to calculate the slope or rate of change of stack $\Delta T$. This is done by comparing the stack $\Delta T$ obtained in Operation 1 with the stack $\Delta T$ from the previous sampling period. The slope $$\frac{\Delta T_n - \Delta T_{n-1}}{\Delta t}$$

is then calculated as previously discussed. The new stack $\Delta T$ is retained as well as the calculated slope.

The third operation is the basic control function. If external means are not being used to control excessive afterburning (such as the introduction of torch oil into the regenerator to consume excess oxygen) the carbon balance adjustment from the basic algorithm can be computed. When means such as torch oil are being used, special coefficients (larger reset control constant and zero proportional control constant) must be used to prevent the resulting rapid decrease in stack $\Delta T$ from causing an erroneous control action to be taken (i.e., a correction for spurious carbon-building conditions). The additional oxygen consumption in the regenerator is due to externally supplied hydrocarbons rather than carbon laid down on the catalyst, and is itself a corrective step for the carbon-burning conditions that actually exist.

The computer than begins the third operation by receiving a signal to determine whether means such as torch oil are being used, as indicated in diamond 504, and when it is not, it utilizes normal coefficients to calculate $\Delta SV_n$ as indicated in block 506. If the thus calculated 166 $SV_n$ is not a significant adjustment as determined in diamond 508 [e.g., 0.08 percent (one step on stepping motor) or greater], no operation is carried out at the end of that sampling period and this adjustment value is retained. If a significant adjustment is called for, the computer (as shown in block 510) samples the RCSV $\Delta P$, regenerator air velocity, and regenerator pressure to obtain the current values thereof to determine whether the unit is operating under any constraint. As shown in diamond 512, the computer then selects the logic path to be followed, depending upon the sign of $\Delta SV_n$. If $\Delta SV_n$ is positive, indicating a carbon-burning correction, it follows the sequence of first comparing the RCSV $\Delta P$ with its lower limit, as represented by diamond 514, and if the RCSV $\Delta P$ is above the lower limit previously set, then the secondary control variable is examined. As shown in diamond 516, the air velocity signal is compared with the desired value and if it is below the target value, a signal is obtained that the RCSV is to be adjusted as shown in block 518. If the air velocity is at or above target, however, the regenerator pressure is then compared to the predetermined maximum regenerator pressure. If the regenerator pressure is at or above the predetermined maximum, a signal is obtained to adjust the RCSV, thereby helping carbon balance but not air velocity. If the regenerator pressure is below the predetermined maximum, a signal is obtained to adjust the FGSV, as shown in block 522, thereby helping both carbon balance and air velocity.

If, however, in the first step it was determined that the RCSV $\Delta P$ was at or below the lower limit, the pressure signal from the regenerator is compared to the predetermined maximum pressure as shown in diamond 524, and if the regenerator pressure is below the maximum limit, a signal is obtained to adjust the FGSV, thereby helping carbon balance, but not air velocity. If the regenerator pressure is at or above the predetermined maximum pressure, the entire unit is in constraint and no action can be taken (as indicated in block 526) and neither carbon balance nor air velocity can be helped.

On the other hand, if the sign of $\Delta SV_n$ (in block 512) is negative, indicating carbon-building conditions, the first step in the logic sequence is to sample the secondary control variable, air velocity, as shown in diamond 550. If the air velocity is at or above the target, a signal is obtained to adjust the RCSV (block 551), thus helping carbon balance but not air velocity. If the air velocity is below target, then the RCSV ΔP is compared to its minimum limit, and if the RCSV ΔP is at or below the minimum, then a signal is obtained to adjust the RCSV (block 551), again helping carbon balance but not air velocity. If the RCSV ΔP is determined as shown in block 552 to be above the predetermined minimum, then the regenerator pressure is compared to the predetermined minimum pressure and if it is at or below that minimum, then a signal is obtained to adjust the RCSV (block 551). If in the step represented by diamond 554 the regenerator pressure is above the predetermined minimum pressure, then a signal is obtained to adjust the FGSV as shown in block 556, thus helping both carbon balance and air velocity. It is thus seen, by advertence to boxes 518 and 551 that signals to adjust the RCSV can be obtained and, by advertence to boxes 522 and 556, it is seen that control signals to adjust the FGSV can be obtained. Note that when FGSV control is possible, both carbon balance and air velocity are helped.

Each of these control signals must be modified to correct for the peculiarities of control by utilizing the FGSV as compared to the RCSV. The modifications are discussed below.

The control signal for adjustment of the RCSV results from a modification of $\Delta SV_n$ (calculated in block 506) and is expressed by the following equation:

$$\Delta RCSV_m \text{by} \times K_{rc} \Delta HSV_n$$

where $\Delta SV_n$ is the output from the carbon balance algorithm (block 506), $K_{rc}$ is proportional to the overall gain of the algorithm, except when $\Delta RCSV$ is limited to the specified quantity $\Delta RCSV_{max}$.

The correction factor $K_{rc}$ is generally obtained by trial and error tuning on the process. The parameters $K_{rc}$ and $\Delta RCSV_{max}$ have been found to vary with slide valve position. They are assumed to be linear functions of the slide valve position and are changed over the limits of the valve travel from about 23 percent to about 45 percent. From 0 to about 23 percent open, a minimum value is established; and from 45 percent to 100 percent open, a maximum value for each is used. In operation, this method of varying the gain has proved to be suitable over a wide range of operating conditions.

The adjustment equation for the FGSV is expressed by the equation:

$$\Delta FGSV_m \text{b0x} - K_{fv} SV_m$$

Note that the output of the carbon balance algorithm is still used, $\Delta SV$, but the correction factor has the opposite sign. This is due to the fact that the flue gas slide valve works in the opposite direction from the regenerated catalyst slide valve in accomplishing the same control objective. The gain coefficient $K_{fv}$ was estimated to be unity, and worked satisfactorily when the slide valve position was not close to its limits of operation, that is, fully open or fully closed. The maximum adjustment per pass, $\Delta FGSV_{max}$, was chosen as 1 percent; i.e., slide valve position can be changed at each adjustment no more than 1 percent of the distance from fully open to fully closed.

In a fluidized catalytic cracking unit wherein the present control system has been successfully employed, the following values have been found to be successful:
a. In the algorithm:
$K_r$=0.0012 percent per °F.
$K_s$=° F.
$K_p$=0.375 percent per °F.-minute
$\Delta t$=2 minutes (sampling period)
b. Correction factor:
$K_{rc}$=0.033($VP$)−0.333
$K_{fv}$=1.0
c. Slide valve change limits:
$\Delta RCSV_{max}$=0.0267($VP$)−0.267 percent
$\Delta FGSV_{max}$=1.0 percent These values were used when indicating carbon balance by the stack $\Delta T$ (i.e., flue gas temperature −bed temperature in the regenerator). In $K_{rc}$ and $\Delta RCSV_{max}$, the factor ($VP$) is the position of the RCSV expressed as percent open, and must be within the range from 23 percent to 45 percent.

Having disclosed my invention in detail, what is to be protected by Letters Patent is to be determined by the appended claims and not be the specific examples and disclosures hereinabove given.

I claim:

1. A method for controlling carbon balance in a fluid catalytic cracking unit while concurrently maximizing a secondary control variable which comprises A. supplying to a digital computer a plurality of signals representing control variables:
   a first signal representing a temperature differential between two locations in the unit, chosen to provide an indication of carbon balance in the unit,
   a second signal representing the pressure drop across the regenerated catalyst slide valve,
   a third signal representing the regenerator pressure, and
   a fourth signal representing a secondary control variable;

B. supplying said digital computer with values representing predetermined limits for the variables represented by said second and third signals, with the predetermined target value of the temperature differential represented by said first signal, and with the predetermined target value for said secondary control variable;

C. when the regenerator is not being supplied with torch oil carrying out in said digital computer the following sequence of steps, repeatedly at predetermined sample periods not greater than 30 minutes, 1. determining the carbon adjustment factor, $\Delta SV_n$, according to the algorithm:

$$\Delta SV_n = K_r[\text{Abs}(\delta T_n) + K_s]\delta T_n + K_p \frac{\Delta T_n - \Delta T_{n-1}}{\Delta t}$$

where $\Delta SV_n$ is the indicated correction in slide valve position for the $n$th sampling expressed in percent based upon slide valve travel, from fully closed to fully open being 100 percent;

$K_r$ is the reset control constant;

$K_s$ is a control constant greater than zero;

$\delta T_n$ is the deviation at the $n$th sampling;

$K_p$ is the proportional control constant;

$\Delta T_n$ is the temperature difference represented by said first signal at the $n$th sampling;

$\Delta T_{n11}$ is the temperature difference represented by said first signal at the $n$th−1 sampling; and $\Delta t$ is the sample period between samplings;

2. when $\Delta SV_n$ is positive, indicating a correction for carbon-burning conditions, determining the desirable control action by the logic sequence:

a. if the pressure drop across the regenerated catalyst slide valve is above the predetermined minimum limit therefor and the secondary control variable is below its target value, obtain a signal to reposition the regenerated catalyst slide valve;

b. if the pressure drop across the regenerated catalyst slide valve is above the minimum limit therefor and the secondary control variable is at or above its target value and the regenerator pressure is at or above the predetermined maximum limit therefor, obtain a signal to reposition the regenerated catalyst slide valve;

c. if the pressure drop across the regenerated catalyst slide valve is above the minimum limit therefor and the secondary control variable is at or above its target value and the regenerator pressure is below the predetermined maximum light therefor, obtain a signal to reposition the flue gas slide valve;

d. if the pressure drop across the regenerated catalyst slide valve is at or below the minimum limit therefor, and if the regenerator pressure is at or above the predetermined maximum limit therefor, take no control action, but if the regenerator pressure is below the predetermined maximum limit therefor, obtain a signal to reposition the flue gas slide valve;
3. when $\Delta SV_n$ is negative, indicating a correction for carbon-building conditions determining the desirable control action by the logic sequence:
  a. if the secondary control variable is at or above its target value, obtain a signal to reposition the regenerated catalyst slide valve;
  b. if the secondary control variable is below its target value and the pressure drop across the regenerated catalyst slide valve is at or below the predetermined minimum value therefor, obtain a signal to reposition the regenerated catalyst slide valve;
  c. if the secondary control variable is below its target value and the pressure drop across the regenerated catalyst slide valve is above the predetermined minimum limit therefor, and the regenerator pressure is at or below the predetermined minimum limit therefor, obtain a signal to reposition the regenerated catalyst slide valve;
  d. if the secondary control variable is below its target value and the pressure drop across the regenerated catalyst slide valve is above the predetermined minimum limit therefor, and the regenerator pressure is above the predetermined minimum therefor, obtain a signal to reposition the flue gas slide valve;
4. and repositioning the valve for which a repositioning signal is obtained.

2. A method as in claim 1 further comprising the steps:
a. if the selected valve is the regenerated catalyst slide valve, correcting said signal by the equation:
$$\Delta RCSV_n = K_{rc} \Delta SV_n$$
where $\Delta RCSV_n$ is the corrected amount of movement to be made in the regenerated catalyst slide valve, no greater than $\Delta RCSV_{max}$ $K_{rc}$ is the regenerated catalyst slide valve correction factor,
$\Delta SV_n$ is the carbon adjustment factor, and
$\Delta RCSV_{max}$ is from 1 to 2 percent of slide valve travel,
to obtain a repositioning signal proportional to the desired amount and direction by which the regenerated catalyst slide valve is to be repositioned;
b. if the selected valve is the flue gas slide valve, correcting said signal by the equation:
$$\Delta FGSV_n = -K_{fg} \Delta SV_n$$
where $\Delta FGSV_n$ is the corrected amount of movement to be made in the flue gas slide valve, no greater than $\Delta FGSV_{max}$,
$K_{fg}$ is the flue gas slide valve correction factor, and
$\Delta FGSV_{max}$ is from 1 to 2 percent of slide valve travel,
to obtain a repositioning signal proportional to the desired amount and direction by which the flue gas slide valve is to be repositioned; and
c. repositioning the selected valve in response to the respective repositioning signal, opening said valve when the signal is positive and closing said valve when the signal is negative.

3. A method in accordance with claim 1 wherein the secondary variable is regenerator air velocity.

4. A method in accordance with claim 1 wherein the secondary variable is reactor temperature.

5. A method in accordance with claim 1 wherein the sample period is about 2 minutes.

6. A method in accordance with claim 1 wherein the secondary variable is regenerator air velocity, the regenerator air velocity is below its predetermined target value, and the sampling period if about 2 minutes, whereby air rate to the regenerator is maximized.

7. A method in accordance with claim 1 wherein, when torch oil is introduced into the regenerator, $K_r$ is increased by a factor of two to four times and $K_p=0$.